United States Patent [19]

Furukawa et al.

[11] Patent Number: 5,684,843
[45] Date of Patent: *Nov. 4, 1997

[54] DATA TRANSMISSION SYSTEM FOR TRANSMITTING INFORMATION FROM A CENTRAL CONTROL UNIT TO A PLURALITY OF TERMINALS

[75] Inventors: Satoshi Furukawa, Suzuka; Yukie Hasegawa, Kasugai; Kazuhiko Omura, Tokai, all of Japan

[73] Assignees: Brother Kogyo Kabushiki Kaisha, Nagoya; Xing Inc., Aichi-ken, both of Japan

[*] Notice: The term of this patent shall not extend beyond the expiration date of Pat. No. 5,548,281.

[21] Appl. No.: 411,415

[22] Filed: Mar. 27, 1995

[30] Foreign Application Priority Data

Mar. 28, 1994 [JP] Japan .................................. 6-057559
Mar. 28, 1994 [JP] Japan .................................. 6-057560

[51] Int. Cl.$^6$ .................................................. H04L 7/02
[52] U.S. Cl. ...................... 375/358; 340/825.08; 370/449
[58] Field of Search ...................... 375/219, 220, 375/222, 223, 259; 370/85.8, 95.2, 97, 955.1, 346, 449, 451; 340/825.08; 395/650; 455/33.1, 33.4, 58, 54.1, 1–10; 381/1–7

[56] References Cited

U.S. PATENT DOCUMENTS 5,548,281  8/1996  Funahashi et al. ................ 340/825.08

*Primary Examiner*—Tesfaldet Bocure
*Assistant Examiner*—Bryan Webster
*Attorney, Agent, or Firm*—Oliff & Berridge

[57] ABSTRACT

A data transmission system includes a polling modem and a central control unit that receives a response signal from a terminal. A data transmission central control unit performs polling type transmission to transmit an information data unit to the terminal that has requested the information data unit. The central control unit also performs loop type transmission to cyclically transmit information data units with their loop flags being set to the terminals in succession. The control portion in the terminals selects the transmission that requires the shortest waiting time.

26 Claims, 11 Drawing Sheets

FIG. 3 (A)

| SONG NUMBER | LOOP FLAG |
|---|---|
| 1 − 1 | |
| 1 − 2 | |
| 1 − 3 | 1 |
| 2 − 1 | 1 |
| ⋮ | ⋮ |

← CENTER LOOP FLAG TABLE

FIG. 3 (B)

| SONG NUMBER | LOOP FLAG |
|---|---|
| 1 − 1 | |
| 1 − 2 | |
| 1 − 3 | 1 |
| 2 − 1 | 1 |
| ⋮ | ⋮ |

← TERMINAL LOOP FLAG TABLE

FIG. 9 (A)

| SONG NUMBER | THE NUMBER OF TIMES THAT EACH SONG HAS BEEN REQUESTED | LOOP FLAG |
|---|---|---|
| 1 − 1 | 5 | |
| 1 − 2 | 1 0 | |
| 1 − 3 | 5 0 | 1 |
| 2 − 1 | 1 5 0 | 1 |
| ⋮ | ⋮ | ⋮ |

← CENTER LOOP FLAG TABLE

FIG. 9 (B)

| SONG NUMBER | LOOP FLAG |
|---|---|
| 1 − 1 | |
| 1 − 2 | |
| 1 − 3 | 1 |
| 2 − 1 | 1 |
| ⋮ | ⋮ |

← TERMINAL LOOP FLAG TABLE

DATA TRANSMISSION SYSTEM FOR TRANSMITTING INFORMATION FROM A CENTRAL CONTROL UNIT TO A PLURALITY OF TERMINALS

BACKGROUND OF THE INVENTION

1. Field of the Invention

The present invention relates to a data transmission system wherein a central control unit and a plurality of terminals are connected by a transmission line, the data transmission system being for transmitting information data from the central control unit to a terminal.

2. Description of the Related Art

Conventionally, there is known a data transmission system, wherein a center (central control unit) is connected to a plurality of terminals by a transmission line. The data transmission system is for transmitting information data including various types of information from a center to a terminal according to demands from the terminal side. An advantage of this type of data transmission system is that a memory device for prestoring data information need not be provided to each terminal, so that the terminals have an extremely simple construction.

SUMMARY OF THE INVENTION

A polling system is a data transmission system, wherein transmission and reception of the information data is controlled by polling between the center and terminals. Polling signals are transmitted in succession from the center to the plurality of terminals. Every terminal is interrogated to determine whether the each terminal requests transmission of information data. When there is a request for transmission from a terminal that has received the polling signal, the request data, which indicates the content and the like of the request, is transmitted from the terminal to the center. When the request data is received at the center, the desired information data is transmitted to the terminal over the channel over which the polling signal was transmitted.

According to this method, however, because the data transmission system interrogates about the data transmission requests at all the terminals in succession, a transmission request made at a terminal will not be responded to until polling for all other terminals is completed. This will cause a problem in that a long time is required for the desired data to be transmitted from the center. Particularly, a large scale system with external transmission lines can have a great many terminals so that information data can not be transmitted quickly to individual terminals.

It is therefore an objective of the present invention to overcome the above-described problems and to provide a data transmission system wherein a terminal can obtain desired information data with a short waiting time.

According to attain the objective and other objectives, the present invention provides a data transmission system for transmitting information from a central control unit to a plurality of terminals through a transmission line, the data transmission system comprising: a central control unit including data memory means for storing a plurality of information data units representing a plurality of different informations; and a plurality of terminals connected to the central control unit via a transmission line, each of the terminals including request means for requesting transmission of an information data unit desired to be obtained at the each terminal, wherein the central control unit further includes: first data transmission means for cyclically transmitting several numbers of information data units in succession toward the plurality of terminals via the transmission line; request receiving means for receiving the request made by the request means of each terminal, at least when the desired information data unit is other than the several numbers of information data units; and second data transmission means for transmitting the desired information data unit to a terminal that has requested the desired information data, in response to the request received by the request receiving means, at least when the desired information data unit is other than the several numbers of information data units, the terminal receiving the desired information data unit transmitted from the central control unit by either one of the first data transmission means and the second data transmission means.

The plurality of information data units may represent a plurality of different informations on images, sounds, or both.

The second data transmission means may transmit the desired information data unit to a terminal that has requested the desired information data, only in the case where the desired information data unit is other than the several numbers of information data units.

The request means of each terminal may include: designation means for designating the desired information data unit; data judging means for judging whether the desired information data unit is among the several numbers of information data units; and request transmission means for transmitting to the central control unit a request signal requesting transmission of the desired information data only in the case where the desired information data is judged to be other than the several numbers of information data units, the request receiving means of the central control unit receiving the request signal and the second data transmission means transmitting the desired information data unit in response to the request signal.

The several numbers of information data units may be selected from the plurality of information data units stored in the data memory means, as those that are presumed to be more frequently requested at the plurality of terminals than the other information data units or as those that have been more frequently requested at the plurality of terminals than the other information data units.

The central control unit may further include: requested time number memory means for storing the number of times, that each of the plurality of information data units has been requested at the plurality of terminals; and information data selecting means for selecting, out of the plural information data units, the several numbers of information data units to be transmitted by the first data transmission means, according to the number of times that the information data units have been requested.

BRIEF DESCRIPTION OF THE DRAWINGS

The above and other objects, features and advantages of the invention will become more apparent from reading the following description of the preferred embodiment taken in connection with the accompanying drawings in which:

FIG. 3(A) is an explanatory diagram showing a structure of a center loop flag table stored in the center;

FIG. 3(B) is an explanatory diagram showing a structure of a terminal loop flag table shown in each terminal;

FIG. 9(A) is an explanatory diagram showing a structure of a center loop flag table according to a modification;

FIG. 9(B) is an explanatory diagram showing a structure of a terminal loop flag table according to the modification;

DETAILED DESCRIPTION OF THE PREFERRED EMBODIMENT

Figure 1:
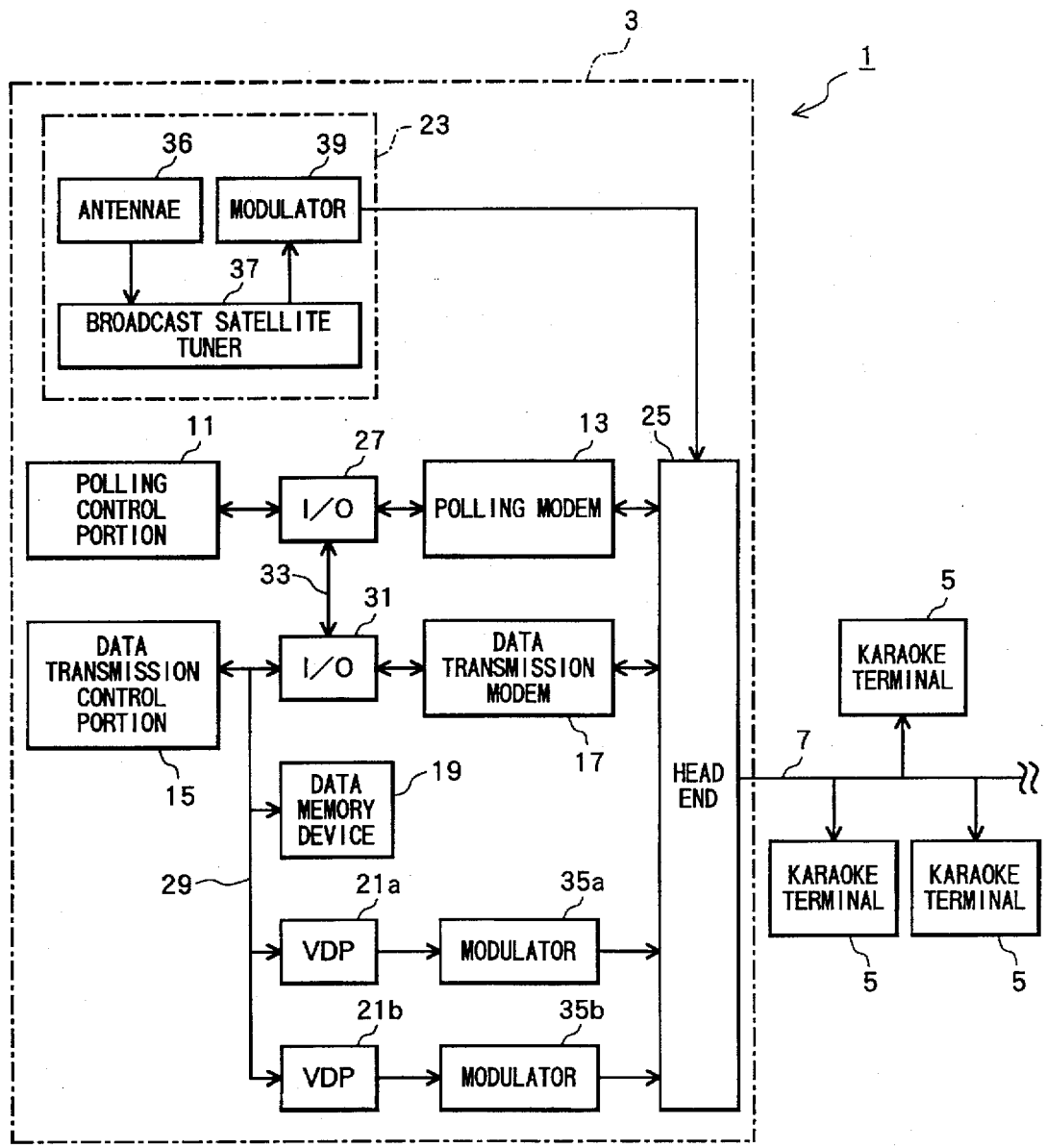
FIG. 1 is a block diagram showing schematic overall structure of a karaoke system and structure of a center of the karaoke system according to an embodiment of the present invention.

A data transmission system according to a preferred embodiment of the present invention will be described while referring to the accompanying drawings wherein like parts and components are designated by the same reference numerals as those shown in FIGS. 1 through 13 to avoid duplicating description. This embodiment is a karaoke system to which the present invention is applied. As shown in FIG. 1, the karaoke system 1 according to this embodiment is constructed from a center 3 connected to a plurality of karaoke terminals 5 by a coaxial cable 7 (transmission line). The karaoke terminals 5 can be provided in separate buildings or in separate establishments or booths within the same building. According to this karaoke system, when a user requests a song he/she desires to sing at each terminal, karaoke song data of the requested song and background image data appropriate for the requested song transmitted from the center are received and reproduced at the terminal. The terminal plays accompaniment music of the requested song while displaying the lyrics of the song and displaying a background image behind the display of the lyrics.

The structure of the center 3 will now be described in detail while referring to FIG. 1.

The center 3 includes a polling control portion 11, a polling modem 13, a data transmission control portion 15, a data modem 17, a memory device 19 in which a plurality of karaoke song data are stored, background image output devices (VDP) 21a and 21b, a broadcast satellite reception system 23, a head end 25, etc.

The polling controlling portion 11 includes well-known components, such as a central processing unit (CPU), a ROM, and a RAM (not shown), and is connected to the polling modem 13 via an input/output interface (I/O) 27. The polling control portion 11 is for producing a polling signal for confirming whether a request for transmission of karaoke song data is present at each terminal.

Figure 4:
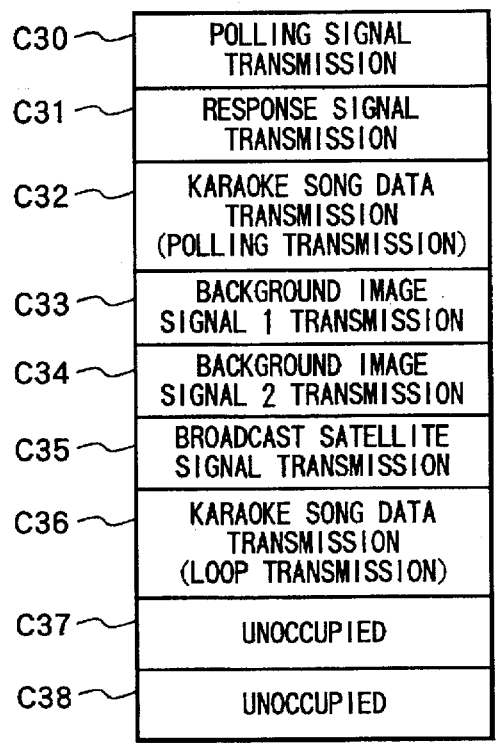
FIG. 4 is an explanatory diagram showing channel structure of the present example.

The polling modem 13 is for modulating the polling signal, outputted by the polling control portion 11, into a radio frequency alternating current signal of a predetermined channel (frequency band). The polling modem 13 outputs the modulated polling signal to the head end 25, from which the modulated polling signal is transmitted toward the karaoke terminals 5. In more concrete terms, as shown in FIG. 4, the polling signal is transmitted over a predetermined channel C30.

It is noted that as will be described later, upon receiving the polling signal, each terminal 5 outputs a response signal for responding to the polling signal, which indicates whether or not the terminal 5 desires transmission of karaoke song data from the center 3. The polling modem 13 is also for receiving and demodulating the response signals thus transmitted from the karaoke terminals 5.

The data transmission control portion 15 includes a CPU, a ROM, and a RAM (not shown), in the same manner as does the polling control portion 11, and is connected to an input/output interface 31, the memory device 19, and the background image output devices 21a and 21b via busline 29. The data transmission control portion 15 is connected to the data modem 17 via the input/output device 31. Also, the data transmission control 15 is connected to the polling control portion 11 by the input/output interfaces 27 and 31 and a transmission line 33 and can transmit data in both directions.

Figure 5:
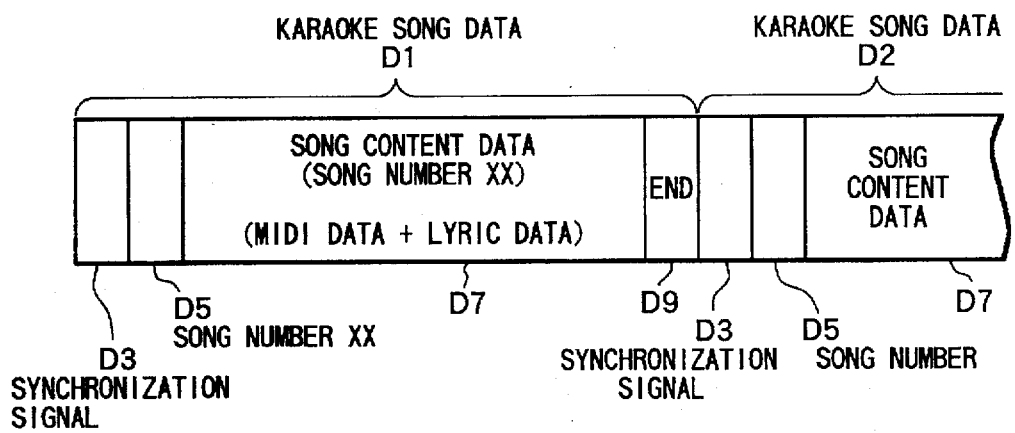
FIG. 5 is an explanatory diagram showing the structure of karaoke song data according to the present example.

A large-capacity memory device, such as a hard disk or an magnetooptic disk, is used for the memory device 19. Several thousand songs worth of karaoke song data are stored in the memory device 19. For example, 5,000 songs are stored in the memory device 19. As shown in FIG. 5, one song worth of karaoke song data D1 includes a synchronization signal D3; song number data D5 that indicates the song number; song content data D7; and partition data D9 for indicating the end of the one song worth of data. The song content data D7 includes lyric data, for being projected on a monitor television 53 of the karaoke terminal 5 (to be described later), and instrumental accompaniment data, for being played by a sound source 45 of the karaoke terminal 5 (also to be described later.) It is noted that the accompaniment data is MIDI (Musical Instrument Digital Interface) standard data.

The memory device 19 also stores therein a center loop flag table as shown in FIG. 3(A). The center loop flag table is for indicating a loop flag condition of each of all the songs whose karaoke song data D1 are stored in the memory device. Songs with their loop flags being set (to 1) are loop-set songs which are to be transmitted in a loop type transmission manner, as will be described later. Songs with their corresponding loop flags not being set (to 1) are non-loop set songs which are to be transmitted in a polling type transmission manner, as also will be described later.

The loop flags are set dependent on information data on how frequently the corresponding songs are requested for karaoke performance at the terminals, for example. In order to obtain the information data, some terminals may be provided with a counter to be used as monitor terminals. The counter provided at each monitor terminal counts the number of times at which each song has been requested at the corresponding terminal. The number counted at each monitor is summed up for all the monitors. Loop flags for most frequently requested 100 or 1,000 songs are set to 1.

The loop flags can alternatively be determined according to "hit charts" made by businesses in the song distributing field. Or otherwise, the loop flags may be freely determined according to the intent of the owner or staff of a karaoke establishment. For example, the owner of a karaoke establishment may assume that newly released songs will be frequently selected, and therefore set them with loop flags. Also, songs that recently become hits can be set with loop flags.

The data transmission modem 17 is for modulating the karaoke song data retrieved from the memory device 19 into a radio frequency alternating current signal of channels (frequency bands) that differ from the channel (frequency band) over which the polling signals are transmitted. As shown in FIG. 4, the karaoke song data is modulated to be transmitted over channels C32 and C36. The data transmission modem 17 outputs the thus modulated karaoke song data to the head end 25, which in turn transmits the karaoke song data over the channels C32 and C36. The channel C32 is for transmitting karaoke song data according to the polling type transmission manner. In other words, karaoke song data is transmitted over channel C32 when requested from a karaoke terminal. The channel C36 is for transmitting karaoke song data according to the loop type transmission manner. Karaoke song data of all the loop-set songs is cyclically transmitted in succession over the channel C36.

The background image output devices (video disk players) 21a and 21b are for outputting background image data (video signals according to standard National Television System Committee (NTSC) system) for projecting on the monitor television 53 of each karaoke terminal 5 (to be described later). The background image data are categorized according to genre of the karaoke songs requestable by the terminals 5. In this concrete example, one output device 21a may store image data of images directed toward Japanese ballads (Enka), and the other output device 21b may store image data of images directed toward popular songs. The background image output devices 21a and 21b are connected to individual modulator 35a and 35b, respectively. The image data from the background image output devices 21a and 21b are modulated by the corresponding modulators 35a and 35b into radio frequency alternating current signals of different channels C33 and C34 as shown in FIG. 4, before being outputted to the head end 25. The channels (frequency bands) C33 and C34 are different from the channels C30, C32 or C36. It is further noted that each of the output devices 21a and 21b always outputs the corresponding background image data. Accordingly, the background image data is always transmitted through the channels C33 and C34 to the terminals 5.

The broadcast satellite reception system 23 includes a reception antennae 36, a broadcast satellite tuner 37, and a modulator 39. The modulator 39 is connected to the head end 25. The broadcast satellite tuner 37 is selected to output broadcast satellite signals including broadcast satellite image signals and broadcast satellite sound signals. The modulator 39 modulates the broadcast satellite signals from the tuner into radio frequency alternating current signals of a channel C35 as shown in FIG. 4, before being outputted to the head end 25. The channel (frequency bands) C35 is different from the channels C30, C32–34 or C36. It is further noted that the tuner 37 always outputs the broadcast satellite signals. Accordingly, the broadcast satellite signals are always transmitted through the channel C35 to the terminals 5.

The head end 25 includes a variety of devices (not shown) such as a mixer for mixing signals inputted thereto and for outputting the mixed signals to the coaxial cable 7. More specifically, the head end 25 has inputted thereto the polling signals from the polling modem 13; karaoke song data from the data transmission modem 17; background image signals from the modulators 35a and 35b; and broadcast satellite signals from the modulator 39 which have been modulated into the different channel signals of the channels. The head end 25 multiplexes the plurality of different channel signals before outputting them to the coaxial cable 7, along which they are transmitted to the karaoke terminals 5.

Figure 2:
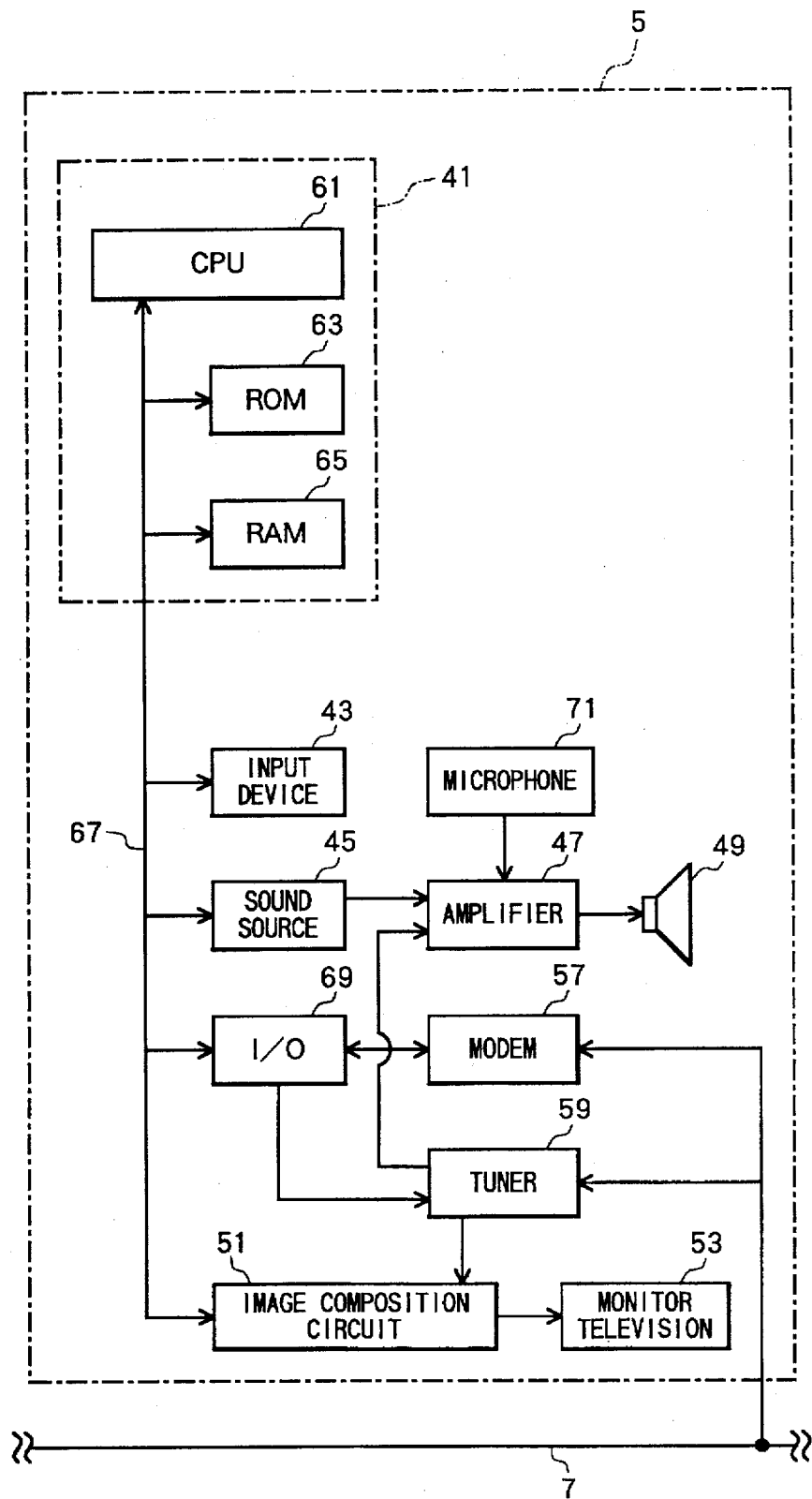
FIG. 2 is a block diagram showing the structure of a karaoke terminal of the present embodiment.

Next, an explanation of the structure of each karaoke terminal 5 will be provided while referring to FIG. 2.

Each karaoke terminal 5 includes a control portion 41 for overall control of the terminal 5, an input device 43, a sound source 45, an amplifier 47, a speaker 49, an image composition circuit 51, a monitor television 53, a terminal modem 57 for receiving and processing the polling signals and the karaoke song data transmitted through the channels C30, C32 and C36 from the center 3, and a video tuner 59 for switching to connect one of the plurality of channels C33–C35 to receive a desired one of the satellite broadcast signals and the background image signals transmitted from the center 3.

The control portion 41 is for performing overall control of the karaoke terminal device 5 and includes a CPU 61, a ROM 63, and RAM 65. The control portion 41 is connected, via a busline 67, to the input device 43, the sound source 45, an input/output interface 69, the image composition circuit 51, etc.

The control portion 41 produces a response signal when a polling signal is transmitted from the center 3. The response signal is a signal for responding to the center 3 to indicate whether a song request (that is, a request for transmission of karaoke song data) has been made by an user at the input device 43. When a request has been made, request data, which indicates the song number of the requested song, is added to the response signal.

The RAM 65 previously stores song name/song genre information data indicating what type of song each of a plurality of songs requestable by the input device 43 corresponds to. In this concrete example, the song name/song genre information data indicates which of the two song genre: Japanese ballads (Enka); and popular songs each of the requestable songs corresponds to. The RAM 65 also serves to temporarily store karaoke song data of the requested song which has been transmitted from the center 3 through the channels C32 and C36.

The RAM 65 further stores therein the terminal loop flag table shown in FIG. 3(B) which is exactly the same as the center loop flag table shown in FIG. 3(A). In this embodiment, this table in each terminal can be rewritten by commands transmitted from the center. The center 3 transmits information on the content of the center loop flag table to each terminal so as to renew the terminal table. Accordingly, a maintenance person need not be sent to each terminal to renew the terminal table.

The input device 43 includes a variety of switches by which a user operates the karaoke terminal 5. More specifically, the input device 43 includes a variety of mode switches (not shown) for selecting between watching a broadcast satellite broadcast and performing a karaoke; a number pad (ten key) fox inputting song numbers of requested karaoke songs; and the like.

The terminal modem 57 is for receiving and demodulating the karaoke song data and the polling signals transmitted from the center 3 via the coaxial cable 7 (over channels C30, C32 and C36) and is also for modulating the response signal outputted from the control portion 41 into a radio frequency alternating current signals of a channel C31 (frequency band) of FIG. 4 and transmitting the modulated response signal to the center 3. The response signal is transmitted over the channel C31 which is a different channel from the channels C30, C32–C35 or C36.

The video tuner 59 is for receiving a broadcast satellite signal, outputted from the broadcast satellite reception system 23 and transmitted from the center 3, and background image signals, outputted from the background image output devices 21a and 21b and transmitted from the center 3. The video tuner 59 is controlled by the control portion 41 to select either one of the channels C33–C35 to receive desired signals.

A microphone 71 is provided in each terminal 5 to produce a singing voice signal when a user sings into the microphone 71.

The sound source (synthesizer sound source) 45 is for converting the MIDI data (accompaniment data), included in the karaoke song data of FIG. 5, into a karaoke accompaniment signal.

The amplifier 47 is for receiving both the karaoke accompaniment signal from the sound source 45 and the singing voice signal from the microphone 71. The amplifier 47 mixes the karaoke accompaniment signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data of FIG. 5, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 having the above-described structure will be provided.

First, an explanation of the operation of the center 3 will be provided. The center 3 of the present invention transmits karaoke song data to terminals according to both the polling type transmission manner and the loop type transmission manner.

The center 3 performs the loop type transmission operation, as described below. The data transmission control portion 15 of the center 3 transmits the karaoke song data of all the loop-set songs in succession over the channel C36 within a fixed time period (i.e., a permissible time period for a user to wait from when the user requests a desired song until when the performance of the song begins) to the karaoke terminals 5 via the coaxial cable 7. This loop type transmission operation is performed regardless of whether or not a loop set song is requested from one of the karaoke terminals 5. In order to perform this operation, the data transmission control portion 15 retrieves karaoke song data of all the loop-set songs from the memory device 19, by referring to the center loop flag table of FIG. 3(A), and transmits them to the data transmission modem 17 via the input/output interface 31. The karaoke song data are then successively transmitted to the karaoke terminals 5 via the head end 25 and the coaxial cable 7. When transmission of all the loop set songs is completed, transmission from the first song is repeated. Thus, the loop-set songs are repeatedly or cyclically transmitted to the terminals.

The center 3 also performs the polling type transmission operation, as described below. The polling control portion 11 performs polling control processes shown in the flowchart of FIG. 6 so as to execute polling to all the terminals 5 in succession over the channel C30. When the center receives a request response signal from a terminal that has requested a karaoke song, the data transmission control portion 15 performs data transmission processes shown in the flowchart of FIG. 7 so as to transmit the requested karaoke song data to the terminal over the channel C32.

The polling control processes executed by the control portion 11 will be described in more detail with referring to FIG. 6. In the polling control processes, the polling control portion 11 first sets the terminal number n to 1, in step 11. (Hereinafter individual steps will be referred to simply as S and the step number.) Then, in S13, the polling control portion 11 produces a polling signal added with the address code indicating the terminal number n. The polling modem 13 modulates the polling signal and outputs it over the channel C30 toward all the terminals 5. Upon receiving the polling signal, each of the karaoke terminals 5 refers to the address code attached to the polling signal to determine whether this polling signal is for itself. Accordingly, the number n terminal 5 determines that the polling signal added with the corresponding address code is for itself.

Then, in S15, the polling modem 13 receives and demodulates a response signal which the number n karaoke terminal 5 has transmitted over the channel C31 in response to the polling signal. In S17, the polling control portion 11 judges, based on the response signal, whether a request for a song has been made at the number n karaoke terminal 5. When a request has been determined as made, the control portion 11 transmits the request data (information on the requested song number, etc.), included in the response signal, to the data transmission control portion 15 in S19, and the program proceeds to S21. On the other hand, if a request is determined not to have been made in S17, the program proceeds directly to S21.

Next, the terminal number n is incremented by one (n=n+1) in S21. The control portion 11 judges whether the newly set terminal number n is greater than the maximum terminal number N (i.e., the total number of the karaoke terminals 5 connected to the center 3), in S23. If not, the program returns to S13, and the processes in S13 through S21 are repeated on the number n+1 karaoke terminal 5. On the other hand, when the number n is determined as greater than N in S23, the program returns to S11, where the terminal number n is reset to 1, and the S13 through S23 are again performed from the number 1 terminal. Thus, polling is performed in succession on all of the number 1 through N terminals, and then when polling has been completed on all of the terminals, polling is again performed from the number 1 terminal.

Next, the data transmission control processes executed by the data transmission control portion 15 will be described in more detail while referring to FIG. 7. In the data transmission control processes, the data transmission control portion 15 first judges whether the control portion 15 receives request data from the polling control portion 11, in S31. If request data has not yet been transmitted, S31 is repeated again and the program waits for reception of data. On the other hand, when the control portion 15 receives request data, the control portion 15 retrieves karaoke song data of the requested song from the memory device 19, referring to the request data (requested song number), in S33. It is noted that the retrieved karaoke song data is then added with an address code indicating the terminal number of the terminal that has transmitted the request response signal, in the same manner as for the polling signal, so that the terminal will properly receive the karaoke song data. Then, in S35, the control portion 15 transfers the retrieved karaoke song data to the data transmission modem 17 via the busline 29 and the input/output interface 31.

The modem 17 transmits the karaoke song data over channel C32, which is different from channels C30 and C31. Accordingly, the karaoke song data transmission operation can be performed even while the polling control portion 11 is transmitting the polling signals to the karaoke terminals 5 via the coaxial cable 7.

When the data transmission operation of the S35 is completed, the program returns to S31, and S31 through S35 are repeated in the same manner as described above, so as to successively transmit karaoke song data to the terminals 5 that have requested to transmit the corresponding karaoke song data.

Next, operations in each karaoke terminal 5 will be described. Each karaoke terminal executes the terminal control operation represented by the flowchart of FIG. 8. In this control process, the CPU 61 first judges whether a song request has been made at the input device 43 in S51. In other words, the CPU 61 judges whether a requested song number has been inputted by the input device 43. If not, the CPU 61 judges whether polling has been transmitted from the center 3 in S53. In other words, the CPU 61 judges whether a polling signal attached with the address code of the corresponding terminal number has been received. If no polling signal has been received, the program repeats S51. When a polling signal has been received by the terminal, the CPU 61 produces a response signal indicating that no request has been made. The modem 57 modulates the response signal and transmits it to the center 3 over channel C31 in S55. Then, the program returns to the S51.

When a request is determined to have been made in the S51, the CPU 61 judges whether or not the requested song is a loop set song, by referring to the table shown in FIG. 3(B). When the loop flag for the requested song is set to 1, and therefore the requested song is determined to be a loop set song, the CPU 61 controls the terminal modem 57 to properly receive transmission of the channel C36 over which the loop set songs including the requested song will be transmitted, in S59. In S61, the CPU 61 refers to the song name/song genre information data stored in the RAM 65, and switches the video tuner 59 to a channel over which a background image signal corresponding to the genre of the requested song will be transmitted.

Next, in S63, the CPU 61 refers to the song number data D5, which is included in each of the plurality karaoke song data transmitted serially over the channel C36 selected in S59, and judges whether the transmitted karaoke song data represents the user's requested song. If not for the desired song, S63 is repeated. However, if the data is for the requested song, the corresponding karaoke song data is temporarily stored in the RAM 65. Afterward, karaoke performance processes are performed in S65.

In the S65, the CPU 61 retrieves the karaoke song data stored temporarily in the RAM 65. The CPU 61 inputs lyric data included in the karaoke song data into the image composition circuit 51 where the lyric data is converted into a lyric/image signal. The CPU 61 also inputs the background image signal transmitted over the channel selected by the video tuner 59 into the image composition circuit 51. The background image and the lyric/image signal are superimposed by the image composition circuit 51, whereupon the characters of the lyrics are displayed on the monitor television 53 superimposed on the background image.

On the other hand, the MIDI data included in the retrieved karaoke song data is converted into an accompaniment signal by the sound source 45 and inputted to the amplifier 47. The accompaniment signal is mixed with the voice signal from the microphone 71 as sung by a user, amplified appropriately, and outputted to the speaker 49.

When the above-described karaoke performance process of S65 is completed, the program returns to S51.

On the other hand, if the requested song is not a loop set song (No in S57), the CPU 61 judges whether a request polling signal is being transmitted from the center 3, in S71. Until the request polling signal is transmitted from the center, S71 is repeated. When the polling signal is transmitted (Yes in S71), the CPU 61 produces a response signal requesting transmission of karaoke song data of the requested song. The response signal is attached with request data indicating the song number of the requested song. The modem 57 modulates the response signal and transmits it to the center 3 over channel C31 in S73. Then, the CPU 61 controls the terminal modem 57 to properly receive transmission of the channel C32 over which the requested song will be transmitted, in S75. Then, in S7, the CPU 61 refers to the song name/song genre information data stored in the RAM 65, and switches the video tuner 59 to a channel over which a background image signal corresponding to the genre of the requested song will be transmitted.

Then CPU 61 judges, in S79, whether the requested karaoke song data is being transmitted over channel C32 from the center 3 in response to the response signal. If no transmission, S79 is repeated and the program thereby waits for transmission of the karaoke song data. On the other hand, when the karaoke song data is transmitted, the CPU 61 temporarily stores the karaoke song data in the RAM 65. Then, the CPU 61 retrieves the karaoke song data from the RAM 65 in S81, and performs karaoke performance processes the same as those of S65, in S83. When the karaoke performance processes are completed, the process returns to S51.

As described above, in the karaoke system of the present embodiment, regardless of whether request of karaoke songs are made at terminal sides, karaoke song data for all the loop set songs are cyclically transmitted over the channel C36 to the terminals in succession. When a user at a terminal requests a loop set song, the terminal can therefore pick up karaoke song data of the requested loop set song within a short period of time. On the other hand, when a user requests a non-loop set song, the terminal requests to the center the transmission of the karaoke song data for the requested non-loop set song. The center transmits over the channel C32 the karaoke song data of the requested non-loop set song.

In the present embodiment, only one channel C36 is used for loop type transmission operation. However, two or more channels may be used for the loop type transmission operation.

Here will be given a modification of the present embodiment. In this modification, the loop flags are updated automatically every predetermined time interval, according to the actual frequency in which corresponding songs are requested in all the terminals 5 connected to the center 3.

In order to achieve this modification, the center loop flag table shown in FIG. 3(A) is replaced with another center loop flag table shown in FIG. 9(A). The table of FIG. 9(A) not only lists the loop flag condition of each song, but also lists the number of times at which each song has been requested and played at all the terminals 5 connected to the center.

The terminal loop flag table shown in FIG. 3(B) is also replaced with another terminal loop flag table shown in FIG.

9(B). This terminal loop flag table is the same as the center loop flag table of FIG. 9(A), except that the number of times requested are not listed. In this modification also, the terminal loop flag table is rewritable from the center side. It is noted that the structure of a karaoke system of this modification is the same as that of the karaoke system of the embodiment described above with referring to FIGS. 1 through 5, except for the loop flag tables.

Figure 6:
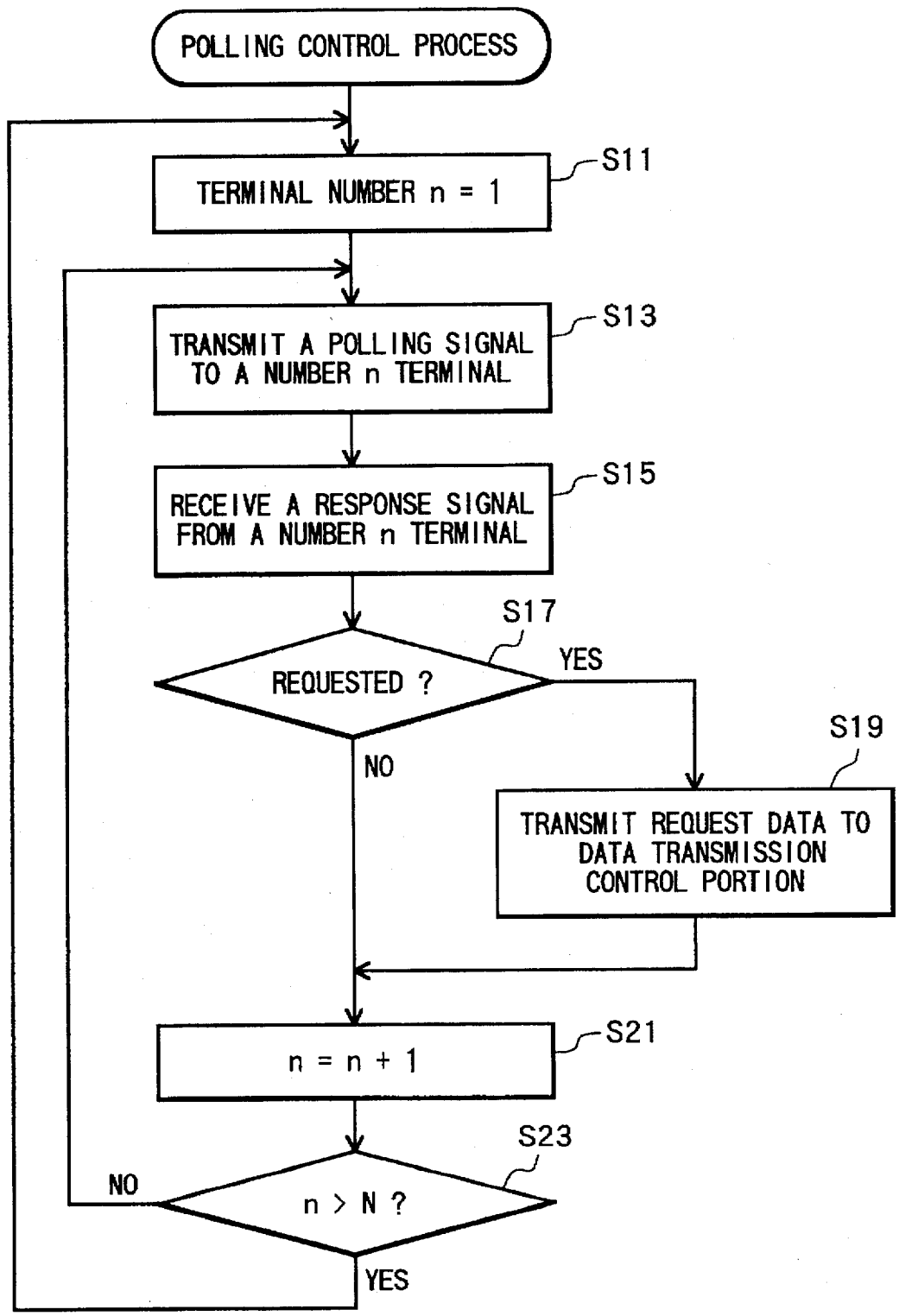
FIG. 6 is a flowchart of polling control processes executed in the center.
Figure 11:
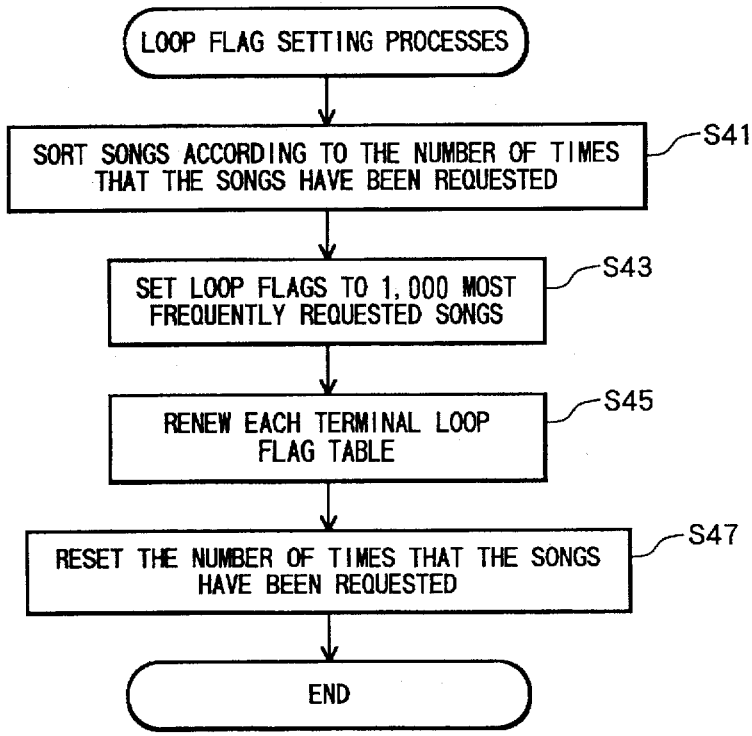
FIG. 11 is a flowchart of loop flag setting processes executed in the center according to the modification.
Figure 8:
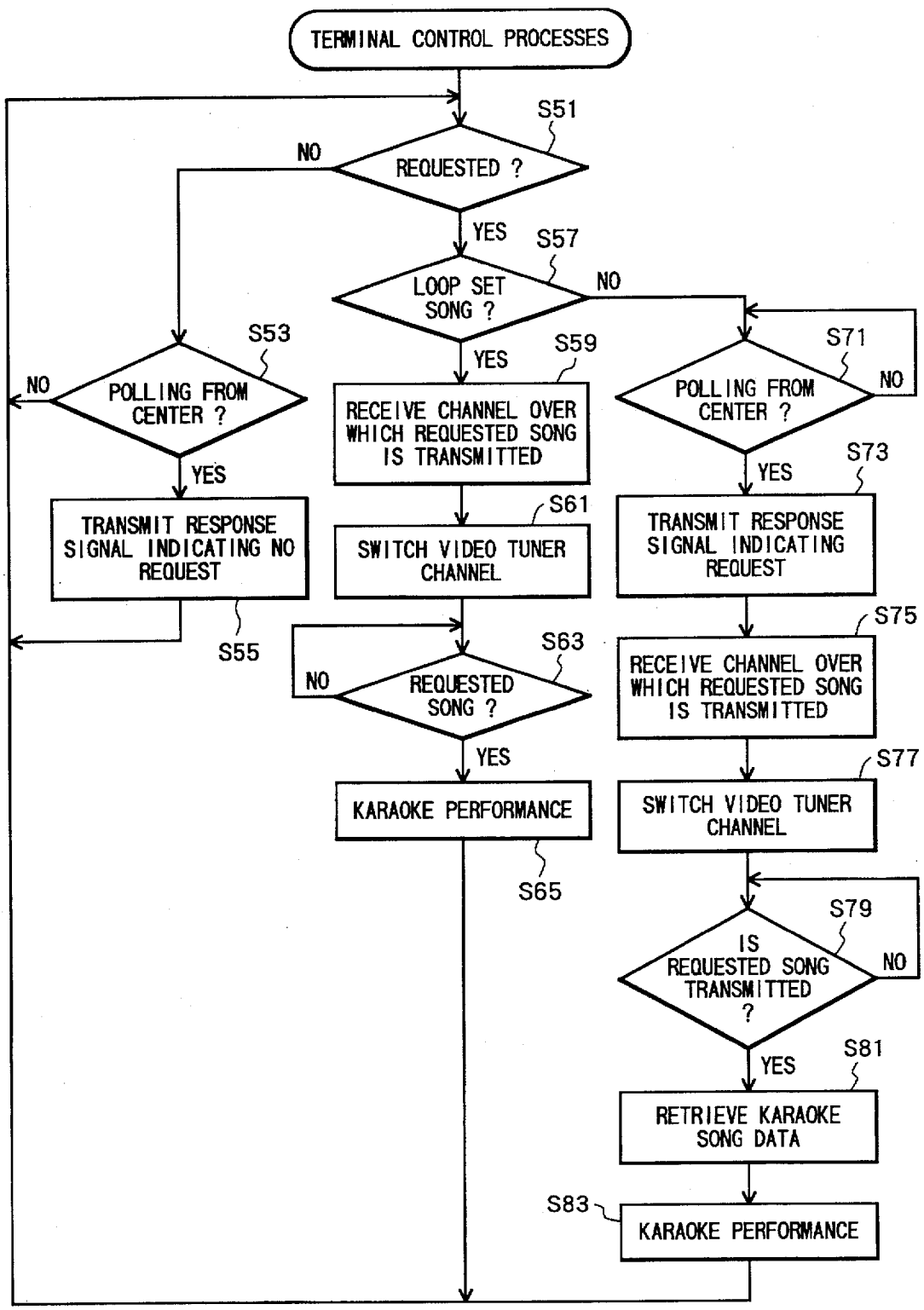
FIG. 8 is a flowchart of terminal control processes executed in each karaoke terminal.
Figure 10:
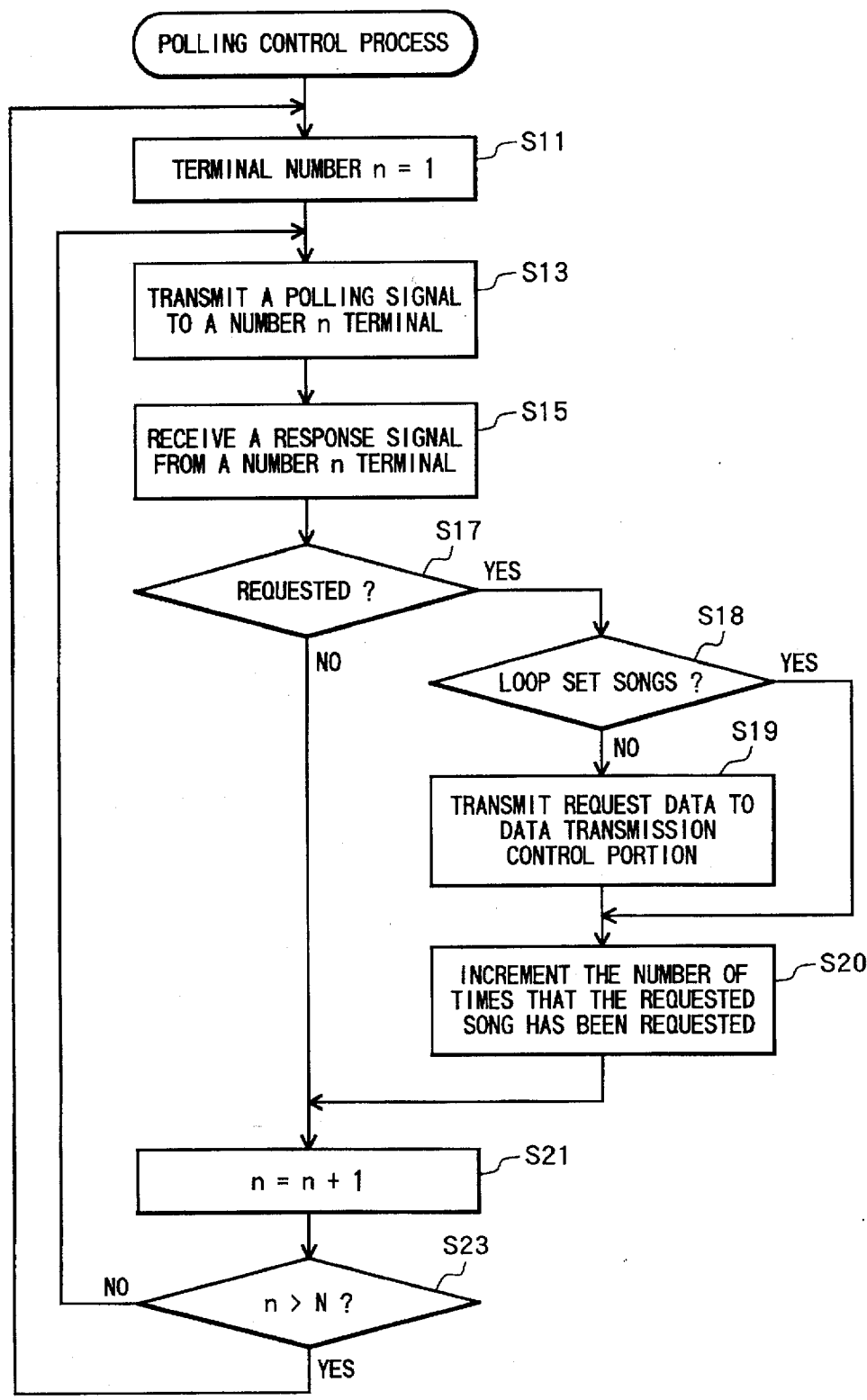
FIG. 10 is a flowchart of polling control processes executed in the center according to the modification.
Figure 12:
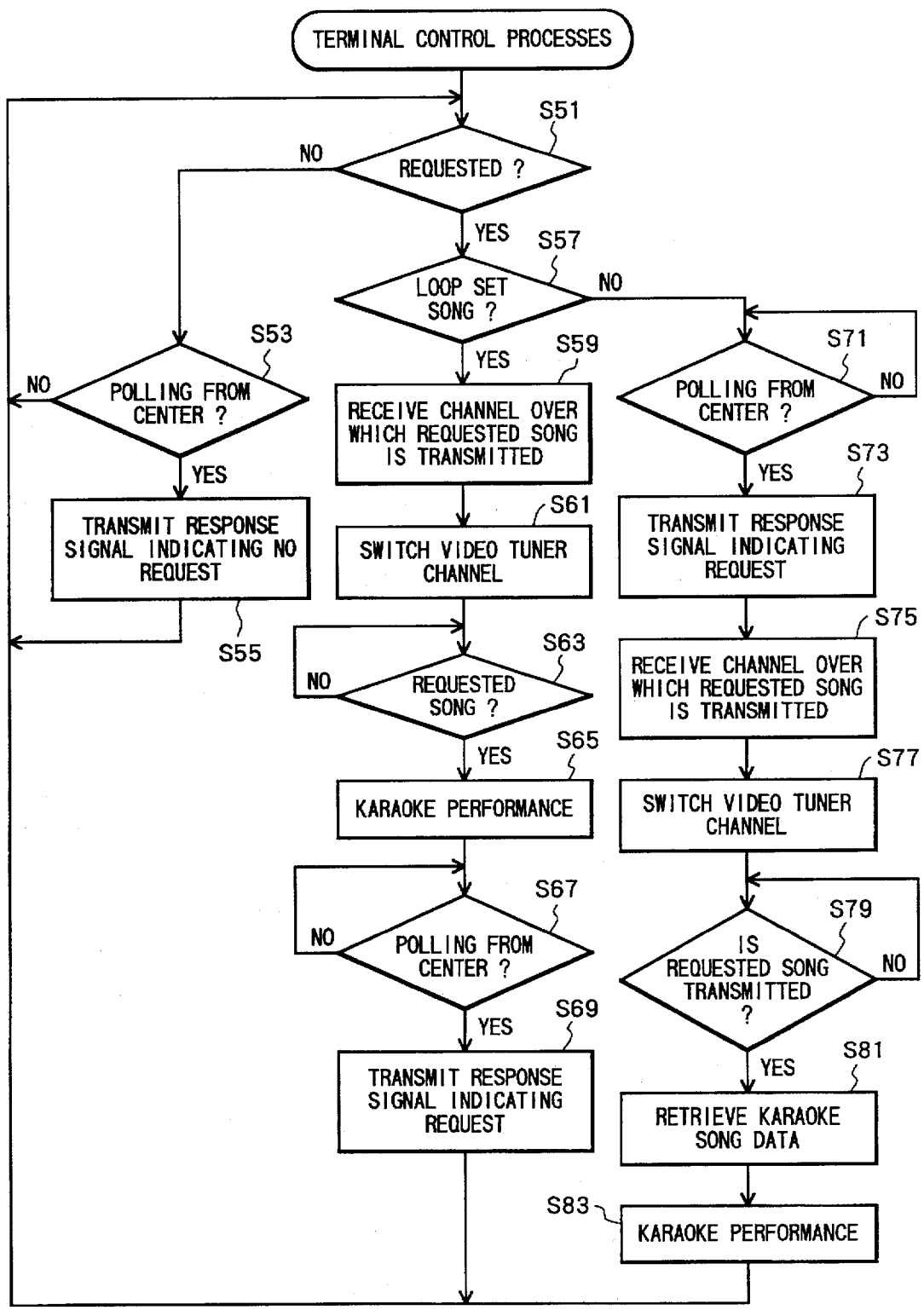
FIG. 12 is a flowchart of terminal control processes executed in each karaoke terminal according to the modification.

In this modification, the center 3 performs the polling control processes shown in FIG. 10 in place of those shown in FIG. 6 of the above-described embodiment. The processes of FIG. 10 are the same as those shown in FIG. 6, except that the processes of FIG. 10 include S18 and S20. The center 3 of this modification also performs loop flag setting operation shown in FIG. 11. Each terminal performs the control processes shown in FIG. 12, in place of those shown in FIG. 8. The processes of FIG. 12 are the same as those of FIG. 8, except that the processes of FIG. 12 include S67 and S69. It is noted that the data transmission control processes of the above-described embodiment shown in FIG. 7 are also performed in this modification in a similar manner.

As shown in FIG. 12, in each terminal 5, when a requested song is a loop-set song (Yes in S57), the terminal picks up the corresponding karaoke song data transmitted over the channel C36 to play karaoke performance in S59–S65 in the same manner as in the embodiment. After the karaoke performance of the picked up karaoke song data is completed, the terminal waits for the transmission of request polling signals from the center in S67. When receiving the request polling signals (Yes in S67), the terminal transmits to the center a request response signal indicating that request has been made at the terminal, in S69. The request response signal is added with the requested song number.

In this modification, therefore, the request response signals transmitted from the terminals not only requests for the non-loop set songs but also requests for the loop set songs. Accordingly, in the polling control processes of FIG. 10, the center 3 judges whether a song requested in the polling response signal is a loop-set song or a non-loop set song. If the requested song is not a loop-set song (No in S18), the control portion 11 transmits the request data included in the response signal to the data transmission control portion 15 in S19, in the same manner as in the embodiment, so that the control portion 15 transmits the corresponding karaoke data to the terminal. Then, the program proceeds to S20 characteristic to this modification. On the other hand, if the requested song is a loop set song (Yes in S18), because the karaoke song data has already been transmitted to the terminal, the program directly proceeds to S20.

In S20, the number of times, listed in the center loop flag table of FIG. 9(A), that the requested song has been requested at the terminals is incremented by one. Thus, every time a song is requested at any terminal, the number of times the song has been requested is incremented by one, regardless of whether the requested song is presently set as a loop-set song or a non-loop set song.

Next, the loop flag setting operation shown in FIG. 11 will be described below. The data transmission control portion 15 performs this operation every predetermined interval, such as every one month.

First, in S41, the CPU in the portion 15 sorts the song numbers, according to the number of requested times listed in the center loop flag table of FIG. 9(A). In other words, the song numbers are arranged, according to the number of times at which the corresponding songs have been requested at all the terminals during the last one month. Then, in S43, loop flags which have been set to 1 are all reset, and then loop flags for the present upper 1,000 songs are newly set to 1. After the center table of FIG. 9(A) is thus renewed, the terminal table of FIG. 9(B) of each terminal is renewed similarly in S45. Then, in S47, the number of requested times are all reset to zero. Thus, according to the above-described process, the 1,000 songs which have been most frequently requested during the last one month are automatically set as loop-set songs for the next one month.

The loop flag setting operation of this modification sets newly released songs to non-loop set songs. However, songs that are increasingly requested to be played will be automatically set to loop-set songs.

The above modification describes setting the 1,000 most frequently requested songs as loop-set songs. However, the 100 most frequently requested songs may be set as loop-set songs. The above modification describes updating the loop flag table every one month. However, the loop flag table may be updated every week. The number of loop-set songs and the time interval at which the table is renewed should be determined according to the total number of songs stored in the memory device 19 and the number of channels usable for transmitting data in the loop-type transmission manner.

As described above, according to this modification, the loop flag table is automatically updated every predetermined interval to properly match the present situation of how frequently respective songs are requested by users. This relieves the staff or owner of karaoke establishment of the need to set the loop flag table manually.

As described above, according to the present invention, the plurality of karaoke songs requestable by the karaoke system are divided into two kinds of karaoke songs: loop-set songs which are frequently requested at terminals; and non-loop set songs which are less frequently requested. The loop-set songs are transmitted in a loop type transmission manner, while the non-loop set songs are transmitted in a polling type transmission manner.

Time required for a user at a terminal to wait from when the user requests a desired song until when the performance of the song begins is determined dependent on the type of the transmission.

In loop type transmission, the plurality of loop-set song data are always transmitted over the transmission line in succession. Contrary to the polling type transmission, a terminal need not wait for polling signals before requesting a desired song, but may directly pick up the desired song which is being transmitted thereto. Accordingly, time required for obtaining the desired data in the loop type transmission manner becomes much shorter than that required in the polling type transmission.

More specifically, according to the loop-type transmission, if the user requests a song immediately before the song data comes from the center, the terminal receives the song data within a very short time period. If the user requests the song immediately after the song data has come, on the other hand, the user has to wait for the next time the song data will come after all the other song data. In the present invention, however, the loop-set songs are limited to the frequently requested songs (1,000 songs, for example), and therefore the number of the song data transmitted by this loop transmission manner is limited. Accordingly, time required for transmitting all the loop-set song data is still short. Thus, the user can still receive the desired song data within a short period of time. Although the above-described embodiment describes using a single channel C36, using two or more channels can further shorten the waiting time because dividing all the loop-set song data into two or more channels can largely drop the number of data per channel.

In the polling type transmission, a longer time is required for desired data to be transmitted from the center, in comparison with the loop-type transmission operation. However, the non-loop set song data supplied by the polling type transmission are those that are less frequently requested than those that are supplied by the loop-type transmission. Accordingly, while a user enjoys karaoke performance of several different songs, most of the songs, that correspond to the frequently requested songs, will be quickly accessed, and only small number of songs, that correspond to the less frequently requested songs, will be accessed not so quickly. Accordingly, a user will receive desired songs with a short waiting time as overall.

According to the present invention, the limited number of songs (1,000 songs, for example) are set as the loop-set songs for being transmitted by the loop type transmission. If all the songs stored in the memory device (5,000 songs, for example) are cyclically transmitted, one cycle period required for transmitting all the songs will become much too long. Using an excessively great number of channels can transmit them in a short cycle period. However, thus occupying the excessively great number of channels for the loop type transmission is not practical, in view of the limited number of channels provided in the transmission line. According to the present invention, the limited number of frequently-requested songs are transmitted in the loop type transmission operation. Less frequently requested songs are transmitted in the polling transmission operation. Thus, the karaoke system of the present invention is a practical system which can supply karaoke songs to a terminal within a short period of time as overall, while preventing occupation of a great number of channels for the loop type transmission.

Figure 13:
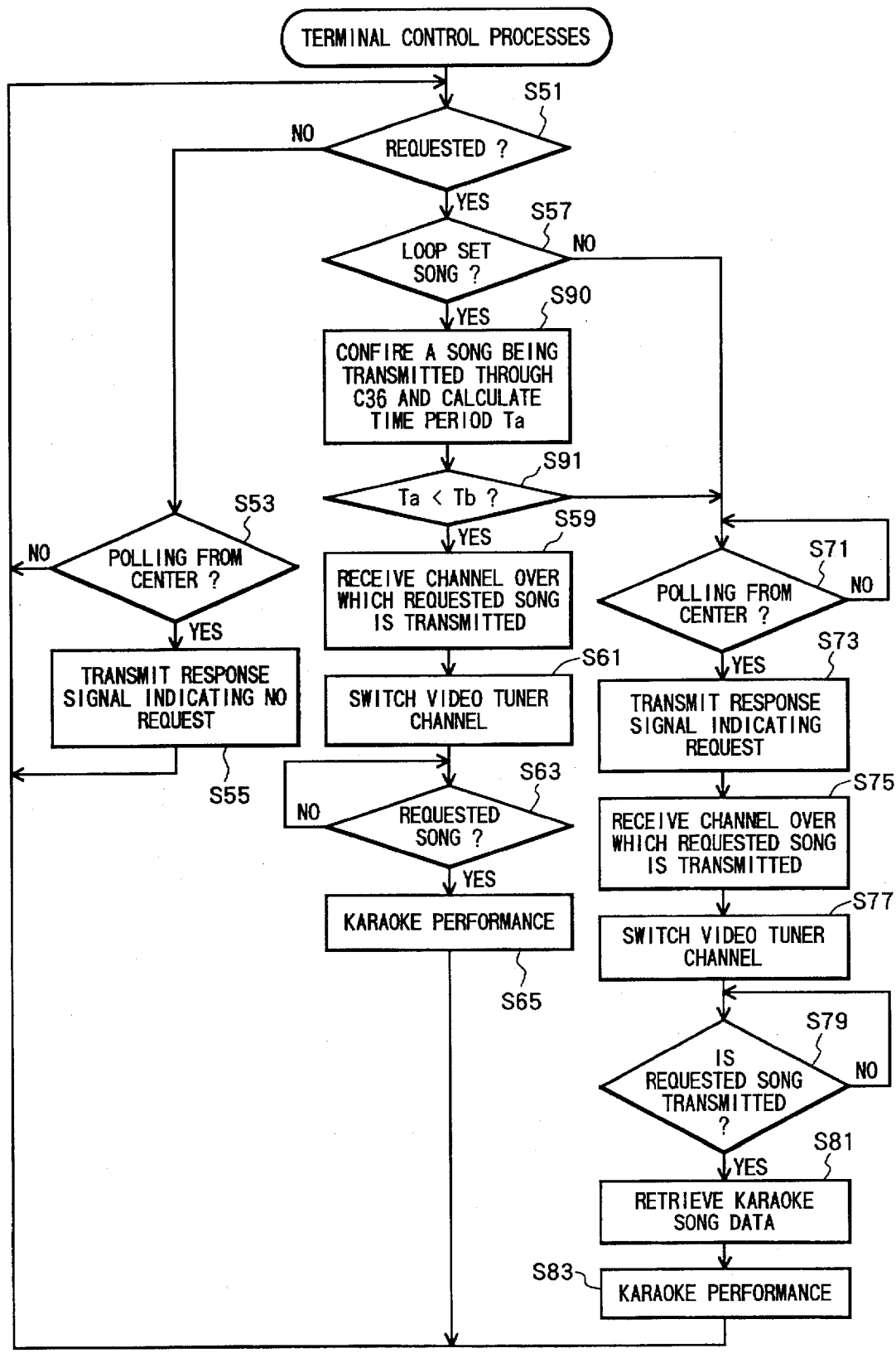
FIG. 13 is a flowchart of terminal control processes executed in each karaoke terminal according to another modification.

Next, another modification will be described with reference to FIG. 13. According to this modification, each terminal performs the terminal control processes of FIG. 13, in place of those of FIG. 8. The processes of FIG. 13 are the same as those of FIG. 8, except that the processes of FIG. 13 include steps S90 and S91. Other steps are the same as those of FIG. 8.

If the requested song is determined to be a loop-set song in S57 (Yes in S57), the process proceeds to S90, where the CPU 61 confirms a song that is now being transmitted via channel C36 in the loop-type transmission manner. The CPU 61 then calculates a value Ta of time period required until the requested song will come through the channel C36 in the loop-type transmission manner. The process then proceeds to S91 where the CPU 61 compares the value Ta with a value Tb which is a mean value of time period required for obtaining any desired song data through the polling type transmission manner. If Ta is shorter than Tb, the CPU 61 determines to receive transmission manner, and the process proceeds to S59. On the other hand, if Ta is equal to or longer than Tb, the CPU 61 determines to receive the requested song data through the polling type transmission manner, and the process proceeds to S71. In this case, though the requested song is a loop-set song, the terminal sends a response signal requesting the transmission of the song data of the requested song. Upon receiving the response signal, the center 3 will transmit song data of the requested song to the terminal through the polling type transmission manner via channel C32.

According to this modification, the terminal selects either one of the loop-type transmission and the polling type transmission that requires shorter time period for obtaining the desired song. Accordingly, the terminal can always obtain desired song data within a short period of time, regardless of the timing at which the terminal requests the desired song.

Alternatively, the terminal may request to the center transmission of the desired song data regardless of whether the desired song data is of the loop-set songs or of the non-loop set songs. The center may compare the time period required for transmitting the desired song data according to the loop type transmission manner with the time period required for transmitting the desired song data according to the polling type transmission manner. The center may select either one of the loop-type transmission and the polling type transmission manner that requires shorter tame period for transmitting the desired song data.

While the invention has been described in detail with reference to a specific embodiment thereof, it would be apparent to those skilled in the art that various changes and modifications may be made therein without departing from the spirit of the invention.

Figure 7:
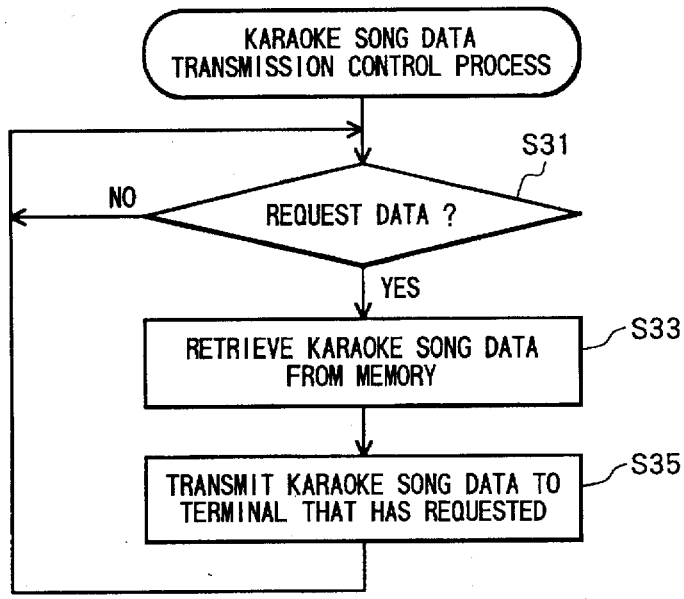
FIG. 7 is a flowchart of data transmission control processes executed in the center.

For example, in the above-described embodiment, the polling control processes shown in FIG. 6 and the data transmission control processes shown in FIG. 7 are executed independently by the two control portions: the polling control potion 11; and the data transmission control portion 15. However, only one control portion with a single CPU may be provided to execute both the polling control processes and the data transmission control processes by multi-task processes and the like. By configuring the center 3 in this way, the configuration of the center 3 becomes simpler and is therefore desirable.

The present invention is not limited to application to a karaoke system but can also be applied to systems for providing various types of information such as weather reports and traffic information.

What is claimed is:

1. A data transmission system for transmitting information from a central control unit to a plurality of terminals through a transmission line, the data transmission system comprising:

the central control unit including data memory means for storing a plurality of information data units representing a plurality of different information; and the plurality of terminals connected to the central control unit via a transmission line, each of the terminals including request means for requesting transmission of an information data unit desired to be obtained at the each terminal, wherein the central control unit further includes:

first data transmission means for cyclically transmitting at least a portion of the plurality of information data units in succession toward the plurality of terminals via the transmission line;

request receiving means for receiving the request made by the request means of each terminal, at least when the desired information data unit is other than the at least a portion of the plurality of information data units, the first data transmission means cyclically transmitting the at least a portion of the plurality of information data units regardless of whether the request receiving means receives the request; and second data transmission means for transmitting the desired information data unit to a terminal that has requested the desired information data unit, in response to the request received by the request receiving means, at least when the desired information data unit is other than the at least a portion of the plurality of information data units, the terminal receiving the desired information data unit transmitted from the central control unit by one of the first data transmission means and the second data transmission means.

2. A data transmission system of claim 1,
wherein the second data transmission means transmits the desired information data unit to a terminal that has requested the desired information data unit, only in the case where the desired information data unit is other than the at least a portion of the plurality of information data units.

3. A data transmission system of claim 2, wherein the request means of each terminal includes:
designation means for designating the desired information data unit;
data judging means for judging whether the desired information data unit is among the at least a portion of the plurality of information data units; and
request transmission means for transmitting to the central control unit a request signal requesting transmission of the desired information data unit only in the case where the desired information data unit is judged to be other than the at least a portion of the plurality of information data units, the request receiving means of the central control unit receiving the request signal and the second data transmission means transmitting the desired information data unit in response to the request signal.

4. A data transmission system of claim 2,
wherein the request means of each terminal includes request transmitting means for transmitting to the central control unit a request signal requesting transmission of the desired information data unit regardless of whether the desired information data unit is among or other than the at least a portion of the plurality of information data units, and
wherein the second data transmission means includes:
data judging means for judging whether the desired information data unit is among the at least a portion of the plurality of information data units; and
data transmitting means for transmitting the desired information data unit to a terminal that has requested the desired information data unit, in response to the request signal, only in the case where the desired information data unit is judged to be other than the at least a portion of the plurality of information data units.

5. A data transmission system of claim 2, wherein the at least a portion of the plurality of information data units are selected from the plurality of information data units stored in the data memory means, as those that are presumed to be more frequently requested at the plurality of terminals than the other information data units.

6. A data transmission system of claim 2, wherein the at least a portion of the plurality of information data units are selected from the plurality of information data units stored in the data memory means, as those that have been more frequently requested at the plurality of terminals than the other information data units.

7. A data transmission system of claim 6, wherein the central control unit further includes:
requested time number memory means for storing the number of times, that each of the plurality of information data units has been requested at the plurality of terminals; and
information data selecting means for selecting, out of the plurality of information data units, the at least a portion of the plurality of information data units to be transmitted by the first data transmission means, according to the number of times that the information data units have been requested.

8. A data transmission system of claim 7,
wherein the central control unit further includes requested time number counting means for counting the number of times that each of the plurality of information data units has been requested at the plurality of terminals during every predetermined time period, the counted results being stored in the requested time number memory means, and
wherein the information data selecting means performs to select the at least a portion of the plurality of information data units, every predetermined time interval corresponding to the predetermined time period, so as to update the at least a portion of the plurality of information data units to be transmitted by the first data transmission means.

9. A data transmission system of claim 2,
wherein the first data transmission means serially transmits the at least a portion of the plurality of information data units, and
wherein each of the terminals includes data selecting means for selecting the desired information data unit, out of the at least a portion of the plurality information data units transmitted from the first data transmission means so as to pick up the desired information data unit.

10. A data transmission system of claim 9, wherein the central control unit further includes data multiplexing transmission means for transmitting the at least a portion of the plurality of information data units and the information data unit other than the at least a portion of the plurality of the information data units over two different channels via the transmission line.

11. A data transmission system of claim 10, wherein the data multiplexing transmission means includes modulating means for modulating each of the at least a portion of the plurality of information data units into an alternating current signal of a frequency band corresponding to one channel and for modulating the information data unit other than the at least a portion of the plurality of information data units into an alternating current signal of another frequency band corresponding to another channel.

12. A data transmission system of claim 11, wherein the request means of each of the plurality of terminals includes channel selecting means for selecting a channel over which the desired information data unit is transmitted.

13. A data transmission system of claim 2,
wherein the central control unit further includes request polling signal transmission means for transmitting a request polling signal, via the transmission line, to the plurality of terminals in succession for detecting whether each terminal requests transmission of the desired information data unit,
wherein the request means in each of the plurality of terminals includes request response signal transmission means for transmitting a request response signal indicating whether the corresponding terminal requests the transmission of the desired information data when the terminal receives the request polling signal, the second data transmission means transmitting the desired information data unit to a terminal that has transmitted the request response signal indicating that the terminal requests the transmission of the desired information data unit.

14. A data transmission system of claim 2, wherein the plurality of information data units represent a plurality of different information selected from a group consisting of images, sounds and a combination of images and sounds.

15. A data transmission system of claim 1, wherein the request means of each terminal includes:

designation means for designating the desired information data unit;

data judging means for judging whether the desired information data unit is among the at least a portion of the plurality of information data units;

time comparing means for comparing a first time period required for receiving the desired information data unit transmitted from the first data transmission means with a second time period required for receiving the desired information data unit transmitted from the second data transmission means; and request transmission means for transmitting to the central control unit a request signal requesting transmission of the desired information data unit in the case where the desired information data unit is judged to be other than the at least a portion of the plurality of information data units and in the case where the desired information data unit is judged to be among the at least a portion of the plurality of information data units and the second time period is equal to or shorter than the first time period, the request receiving means of the central control unit receiving the request signal and the second data transmission means transmitting the desired information data unit in response to the request signal.

16. A data transmission system of claim 1, wherein the request means of each terminal includes request transmitting means for transmitting to the central control unit a request signal requesting transmission of the desired information data unit regardless of whether the desired information data unit is among or other than the at least a portion of the plurality of information data units, wherein the central control unit further includes:

data judging means for judging whether the desired information data unit is among the at least a portion of the plurality of information data units; and time comparing means for comparing a first time period required for transmitting the desired information data unit by the first data transmission means with a second time period required for transmitting the desired information data unit by the second data transmission means, wherein said second data transmitting means transmits the desired information data unit to a terminal that has requested the desired information data unit, in response to the request signal, in the case where the desired information data unit is judged to be other than the at least a portion of the plurality of information data units and in the case where the desired information data unit is judged to be among the at least a portion of the plurality of information data units and the second time period is equal to or shorter than the first time period.

17. A data transmission system of claim 1, wherein the request means of each terminal includes request transmitting means for transmitting to the central control unit a request signal requesting transmission of the desired information data unit regardless of whether the desired information data unit is among or other than the at least a portion of the plurality of information data units, and wherein the second data transmission means includes:

data judging means for judging whether the desired information data unit is among the at least a portion of the plurality of information data units; and data transmitting means for transmitting the desired information data unit to a terminal that has requested the desired information data unit, in response to the request signal, only in the case where the desired information data unit is judged to be other than at least a portion of the plurality of information data units.

18. A data transmission system of claim 1, wherein the at least a portion of the plurality of information data units are selected from the plurality of information data units stored in the data memory means, as those that have been more frequently requested at the plurality of terminals than the other information data units.

19. A data transmission system of claim 18, wherein the central control unit further includes:

requested time number memory means for storing the number of times that each of the plurality of information data units has been requested at the plurality of terminals; and information data selecting means for selecting, out of the plurality of information data units, the at least a portion of the plurality of information data units to be transmitted by the first data transmission means, according to the number of times that the information data units have been requested.

20. A data transmission system of claim 19, wherein the central control unit further includes requested time number counting means for counting the number of times that each of the plurality of information data units has been requested at the plurality of terminals during every predetermined time period, the counted results being stored in the requested time number memory means, and wherein the information data selecting means performs to select the at least a portion of the plurality of information data units, every predetermined time interval corresponding to the predetermined time period, so as to update the at least a portion of the plurality of information data units to be transmitted by the first data transmission mean.

21. A data transmission system for transmitting information from a central control unit to a plurality of terminals through a transmission line, the data transmission system comprising:

the central control unit including data memory means for storing a plurality of information data units representing a plurality of different information; and the plurality of terminals connected to the central control unit via a transmission line, each of the terminals including request means for requesting transmission of an information data unit desired to be obtained at the each terminal, wherein the central control unit further includes:

first data transmission means for cyclically transmitting at least a portion of the plurality of information data units in succession toward the plurality of terminals via the transmission line;

request receiving means for receiving the request made by the request means of each terminal, at least when the desired information data unit is other than the at least a portion of the plurality of information data units, said request means of each terminal including request transmitting means for transmitting to the central control unit a request signal requesting transmission of the desired information data unit regardless of whether the desired information data unit is among or other than the at least a portion of the plurality of information data units; and second data transmission means for transmitting the desired information data unit to a terminal that has requested the desired information data unit, in response to the request received by the request receiving means, said second data transmission means including data judging means for judging whether the desired information data unit is among the at least a portion of the plurality of information data units; and data transmitting means for transmitting the desired information data unit to a terminal that has requested the desired information data, in response to the request signal, only in the case where the desired information data unit is judged to be other than the at least portion of the plurality of information data units, the terminal receiving the desired information data unit transmitted from the central control unit by one of the first data transmission means and the second data transmission means.

22. A data transmission system for transmitting information from a central control unit to a plurality of terminals through a transmission line, the data transmission system comprising:

the central control unit including data memory means for storing a plurality of information data units representing a plurality of different information; and the plurality of terminals connected to the central control unit via the transmission line, each of the terminals including request means for requesting transmission of an information data unit desired to be obtained at the each terminal, wherein the central control unit further includes:

first data transmission means for cyclically transmitting at least a portion of the plurality of information data units in succession toward the plurality of terminals via the transmission line;

request receiving means for receiving the request made by the request means of each terminal, at least when the desired information data unit is other than the at least a portion of the plurality of information data units; and second data transmission means for transmitting the desired information data unit to a terminal that has requested the desired information data unit, in response to the request received by the request receiving means, at least when the desired information data unit is other than the at least a portion of the plurality of information data units, the terminal receiving the desired information data unit transmitted from the central control unit by one of the first data transmission means and the second data transmission means, wherein the at least a portion of the plurality of information data units are selected from the plurality of information data units stored in the data memory means, as those that have been more frequently requested at the plurality of terminals than the other information data units.

23. A data transmission system of claim 22, wherein the central control unit further includes:

requested time number memory means for storing the number of times that each of the plurality of information data units has been requested at the plurality of terminals; and information data selecting means for selecting, out of the plurality of information data units, the at least a portion of the plurality of information data units to be transmitted by the first data transmission means according to the number of times that the information data units have been requested.

24. A data transmission system of claim 23, wherein the central control unit further includes requested time number counting means for counting the number of times that each of the plurality of information data units has been requested at the plurality of terminals during every predetermined time period, the counted results being stored in the requested time number memory means, and wherein the information data selecting means performs to select the at least a portion of the plurality of information data units every predetermined time interval corresponding to the predetermined time period so as to update the at least a portion of the plurality of information data units to be transmitted by the first data transmission means.

25. A data transmission system for transmitting information from a central control unit to a plurality of terminals through a transmission line, the data transmission system comprising:

the central control unit including data memory means for storing a plurality of information data units representing a plurality of different information; and the plurality of terminals connected to the central control unit via the transmission line, each of the terminals including request means for requesting transmission of an information data unit desired to be obtained at the each terminal, wherein the central control unit further includes:

first data transmission means for cyclically transmitting at least a portion of the plurality of information data units in succession toward the plurality of terminals via the transmission line;

request receiving means for receiving the request made by the request means of each terminal, at least when the desired information data unit is other than the at least a portion of the plurality of information data units wherein said request means of each terminal includes:

designation means for designating the desired information data unit;

data judging means for judging whether the desired information data unit is among the at least a portion of the plurality of information data units;

time comparing means for comparing a first time period required for receiving the desired information data unit transmitted from the first data transmission means with a second time period required for receiving the desired information data unit transmitted from the second data transmission means; and request transmission means for transmitting to the central control unit a request signal requesting transmission of the desired information data unit in the case where the desired information data unit is judged to be other than the at least a portion of the plurality of information data units and in the case where the desired information data is judged to be among the at least a portion of the plurality of information data units and the second time period is equal to or shorter than the first time period, the request receiving means of the central control unit receiving the request signal and the second data transmission means transmitting the desired information data unit in response to the request signal; and second data transmission means for transmitting the desired information data unit to a terminal that has requested the desired information data unit, in response to the request received by the request receiving means, at least when the desired information data unit is other than the at least a portion of the plurality of information data units, the terminal receiving the desired information data unit transmitted from the central control unit by one of the first data transmission means and the second data transmission means.

26. A data transmission system for transmitting information from a central control unit to a plurality of terminals through a transmission line, the data transmission system comprising:

the central control unit including data memory means for storing a plurality of information data units representing a plurality of different information; and the plurality of terminals connected to the central control unit via the transmission line, each of the terminals including request means for requesting transmission of an information data unit desired to be obtained at the each terminal, wherein the central control unit further includes:

first data transmission means for cyclically transmitting at least a portion of the plurality of information data units in succession toward the plurality of terminals via the transmission line;

data judging means for judging whether the desired information data unit is among the at least a portion of the plurality of information data units;

request receiving means for receiving the request made by the request means of each terminal, at least when the desired information data unit is other than the at least a portion of the plurality of information data units, wherein said request means of each terminal includes request transmitting means for transmitting to the central control unit a request signal requesting transmission of the desired information data unit regardless of whether the desired information data unit is among or other than the at least a portion of the plurality of information data units;

second data transmission means for transmitting the desired information data unit to a terminal that has requested desired information data unit, in response to the request received by the request receiving means, at least when the desired information data unit is other than the at least a portion of the plurality of information data units, the terminal receiving the desired information data unit transmitted from the central control unit by one of the first data transmission means and the second data transmission means; and time comparing means for comparing a first time period required for transmitting the desired information data unit by the first data transmission means with a second time period required for transmitting the desired information data unit by the second data transmission means whereby when the desired information data unit is judged to be among the at least portion of the plurality of information data units and the first time period is greater than the second time period.

* * * * *